Jan. 31, 1967            G. A. YOUNG            3,301,169
TABLE OVEN
Filed Feb. 19, 1965
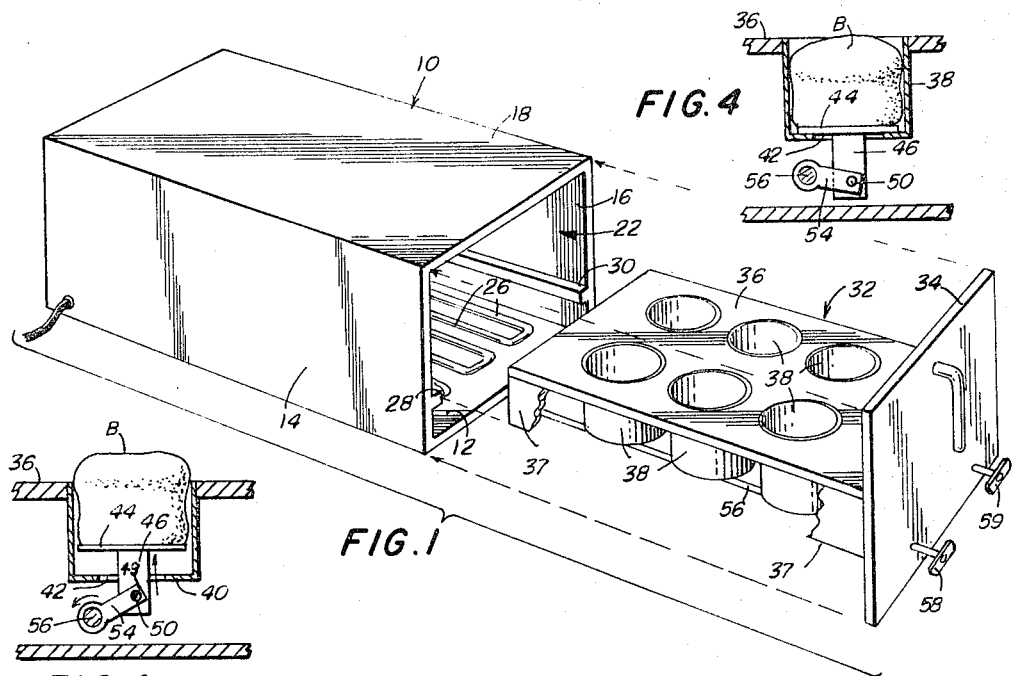
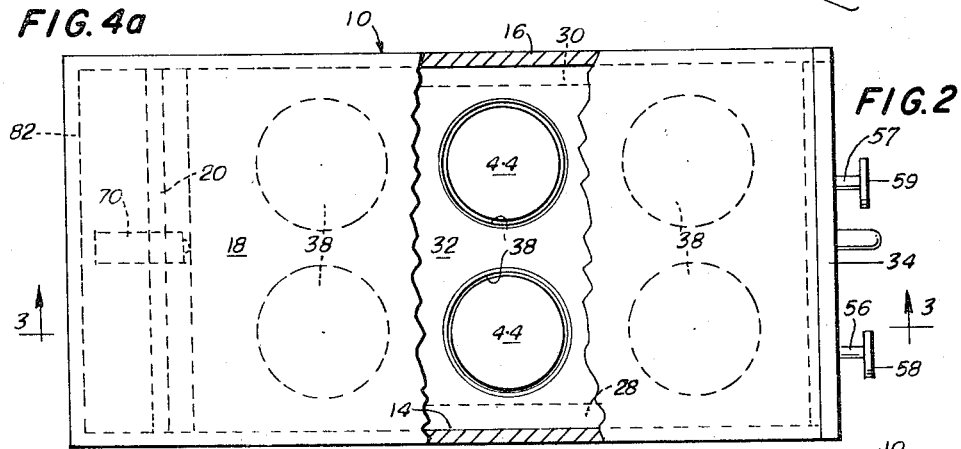
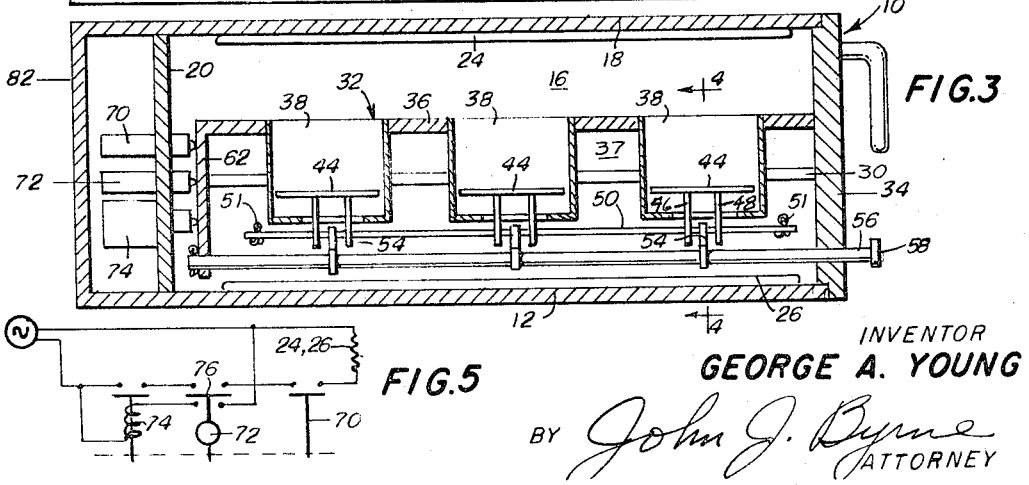
INVENTOR
GEORGE A. YOUNG
BY John J. Byrne
ATTORNEY

United States Patent Office 3,301,169
Patented Jan. 31, 1967

3,301,169
TABLE OVEN
George A. Young, 1194 Indian Mound Road,
Lexington, Ky. 40502
Filed Feb. 19, 1965, Ser. No. 434,019
3 Claims. (Cl. 99—327)

This invention relates generally to a self-service cooking oven for use at individual restaurant tables. More particularly, the invention relates to apparatus for the baking of individual servings of rolls, biscuits or other types of bread products in the amount normally consumed by one or several patrons at a restaurant. The device is sized and constructed so that it is conveniently located at or near a restaurant table without obstructing the acivities of those at the table, and is so insulated that it will never be uncomfortably hot to those who accidentally touch the exterior thereof.

In the serving of food at a restaurant, bread of one sort or the other is normally served with the meal. Hot breads, because of their taste and aroma, are very popular with the general public During rush periods of business, however, it is often difficult to serve breads in this freshly baked condition. If the bread is served too far in advance of the entrée, it is no longer enjoyed as a warm bread and, if the water delays its serving until the meal is served, his work load is compounded during his most difficult serving period. Therefore, it is a principal objective of this invention to provide an apparatus which conveniently bakes bread at the serving table and maintains the bread in a warm condition as desired by the patron.

A further important objective of this invention is to provide an apparatus wherein the bread product can be prepared in advance in baking drawers which are stored in a refrigerated condition and brought to the table after the patrons are seated. The device is constructed so that when the drawer is inserted in the oven, the baking begins and the bread is finished at approximately the time that the principal course is served.

Another important objective of the invention is to provide a baking drawer having a panel section comprising the front door of the cooking oven.

Another important objective of this invention is to provide an apparatus of the type described wherein there are means to partially eject the baking drawer from the oven when the baking cycle is completed.

Another important objective of this invention is to provide a table top oven of a type so insulated that one will not be burned or startled when making bodily contact therewith.

A further objective of the invention is to provide a baking drawer wherein means are provided to eliminate the sticking tendency of a bread with its baking receptacle.

A still further objective of this invention is to provide a cooking apparatus having means to mechanically eject the baked products from their baking receptacles.

These and other objectives of this invention will become more apparent upon a reading of the following specification taken in view of the attached drawings wherein:

FIGURE 1 is an exploded perspective of the invention showing the cooking drawer prior to insertion into the baking oven;

FIGURE 2 is a plan view of the cooking drawer after insertion into the oven;

FIGURE 3 is a cross-sectional view along the lines 3—3 of FIGURE 2;

FIGURE 4 is a cross-sectional view along the lines 4—4 of FIGURE 3;

FIGURE 4a is a view similar to FIGURE 4 with the working elements moved to an operating position; and FIGURE 5 is a schematic of the electrical circuitry utilized with the structure described.

Refrring now with more particularity to the drawings wherein like elements indicate like parts, the numeral 10 indicates an oven structure of convenient rectangular design, fully insulated and having an exterior of pleasing appearance. The oven is comprised of a bottom 12, a pair of sides 14 and 16, a top 18 and a rear wall 20. A front opening 22 is formed between the top, bottom, and sides. Disposed on the inside surface of top 18 is a heating element 24 and disposed along the bottom 12 is a heating element 26. Although shown as conventional electrical resistance heaters, it is to be understood that the invention encompasses other types of cooking elements such as infra-red and other electronic wave-length heating means. Horizontally disposed intermediate the height of side walls 14 and 16 are slide rails 28 and 30. The slide flanges slidably receive a baking tray generally indicated by the numeral 32.

Unit 32 is comprised basically of a door panel 34 and a tray 36. Side skirts 37 are provided to slidably engage the rails 28 and 30. The tray 36 is formed with a plurality of baking cups 38. The cups are arranged in longitudinal rows. At each of the cup bottoms, an interiorly directed flange 40 defines an opening 42. As best seen at FIGURES 3, 4 and 4a, the openings 42 are closed by a circular bottom plate 44. The plate 44 of each cup is moved vertically to eject a biscuit B when necessary.

Each bottom plate is formed with a pair of downwardly extending flanges 46 and 48 having opposing openings 49 therethrough. The openings 49 receive a common tie-rod 50. The rod 50 is disposed below each row of cups and extends through all of the openings 49. The tie-rod is secured by way of the split pins 51.

Offset below each row of cups and the rods 50 are a pair of shafts 56 and 57. The outer ends of shafts 56 and 57 are journalled through door 34 and are terminated, respectively, by handles 58 and 59. At their other ends the shafts are rotatably received by the depending wall 62 extending downwardly from the rear of tray 36.

Extending outwardly from shafts below each of the cups are a plurality of throws 54. Each of the throws is apertured to receive the tie-rod 50. As seen best in FIGURES 4 and 4a, as the handles are rotated in a counter-clockwise direction, the bottoms 44 are lifted off the annular flange 40.

The inner walls of the baking cups 38 and the upper surface of bottoms 44 are lined with Teflon or other suitable material in order to facilitate removal of the biscuits upon completion of the baking cycle. This feature, together with the lifting bottom member, insures that no difficulty will be encountered in removing the warm biscuits from the baking cups.

The downwardly depending wall 62 engages a plurality of switches mounted on the interior of the rear panel 20 when the drawer is fully received in the oven. This can be best seen in FIGURE 3. The switches are comprised of an on-off switch 70, a timing switch 72 and a push-out solenoid switch member 74. As the baking drawer is inserted into the oven, all three switches are pushed inwardly. As seen in FIGURE 5, switches 70, 72 and 74 are closed completing the circuit to the heating elements 24 and 26. The heating elements receive current until the timer element 72 retracts its switch arm 76 to interrupt the heating circuit and to complete the solenoid circuit to 74. The arm of solenoid 74 moves outwardly, pushing the front of the tray approximately two inches from the baking oven. Concurrent with this, the entire circuit leading to the electrical source 80 is broken by the solenoid contacts. The oven remains off until the door is pushed back into the oven, at which time the timer element 72 is re-set. An oven extension 82 is provided to provide a rear housing to accommodate the switch bodies and the necessary electrical conduits, fuses and the like.

In order to more fully understand the objectives and advantages of this invention, the contemplated mode in which the invention is to be used will be described. The restaurateur prepares an uncooked dough or partially cooked dough mixture and places a portion of same in each of the baking depressions 38. The portions are then refrigerated until time of use. As has previously been stated, the baking ovens will be permanently located near a serving table. After patrons have been seated at the serving table, the waiter will bring a tray of uncooked breads to the table and insert it into the baking oven. The orders for the principal meal and beverage are then taken. After approximately fifteen to twenty minutes (or the time desired for cooking the particular breads selected), the timer unit breaks the circuit as previously described.

If there is any difficulty in removing the hot breads from the baking depressions, the handles 58 and 59 are rotated to partially eject the cooked breads from their baking depressions. If only a portion of the breads is used at one time, the tray is partially re-inserted into the oven.

With the structure described above, it can be seen that the advantages and objectives listed heretofore are accomplished. The waiter is relieved from serving hot breads at a time most inconvenient to him and the patrons have their breads readily available to them after the cooking cycle.

In a general manner, while there has been disclosed effective and efficient embodiments of the invention, it should be well understood that the invention is not limited to such embodiments, as there might be changes made in the arrangement, disposition, and form of the parts without departing from the principle of the present invention as comprehended within the scope of the accompanying claims.

I claim:

1. A table appliance comprising an insulated housing having an opening leading to the interior thereof, cooking elements supported within said housing, a food-receiving tray unit, means to slidably receive said tray in said housing, an insulated cover forming one end of said tray unit closing said opening when said tray unit is fully received in said housing, an electrical conduit between a power source and said cooking elements, a first switch across said conduit, a timing unit having a second switch across said conduit, an ejecting mechanism having a third switch across said conduit, means closing said first and second switches when said tray unit is fully received by said housing and starting said timing unit, and second means momentarily closing said third switch after said timing unit has been in operation a selected period of time.

2. An electronic cooking appliance comprising an elongated housing having an opening leading to the interior thereof, heating elements supported within said housing, a tray having a plurality of dough receiving cups formed therein, rails formed interiorly of said housing slidably supporting said tray in said housing, and a cover forming one end of said tray for closing said opening when said drawer is fully received in said housing, an inwardly directed annular flange forming an opening in the bottom of each cup, a bottom plate normally resting on said flange and closing said bottom, and means exterior of said housing to lift said bottom plates from said flange.

3. The appliance defined in claim 2 wherein said means includes a shaft extending below said cups and rotatably secured in said cover, a handle attached to one end of said shaft for rotating same, and linkage means between said bottom plates and shaft for lifting said plates where said shaft is rotated.

References Cited by the Examiner
UNITED STATES PATENTS

| 1,694,762 | 12/1928 | Ackerman | 99—335 |
| 1,862,733 | 6/1932 | Wright | 99—332 |
| 2,086,827 | 7/1937 | Smith | 219—407 |
| 2,274,190 | 2/1942 | Cramer | 99—390 |
| 2,559,801 | 7/1951 | Sarchet | 99—332 |
| 2,630,062 | 3/1953 | Litt | 99—327 |
| 2,651,702 | 9/1953 | Burke et al. | 219—348 X |
| 2,785,642 | 3/1957 | Ward | 107—54 |
| 2,888,888 | 6/1959 | Jorgenson et al. | 107—54 |

BILLY J. WILHITE, *Primary Examiner.*